May 10, 1949.　　W. E. TEMPLETON　　2,469,615
TRACTOR SHOVEL ATTACHMENT
Filed Feb. 18, 1946　　　　　　　　　　　　　　2 Sheets-Sheet 1
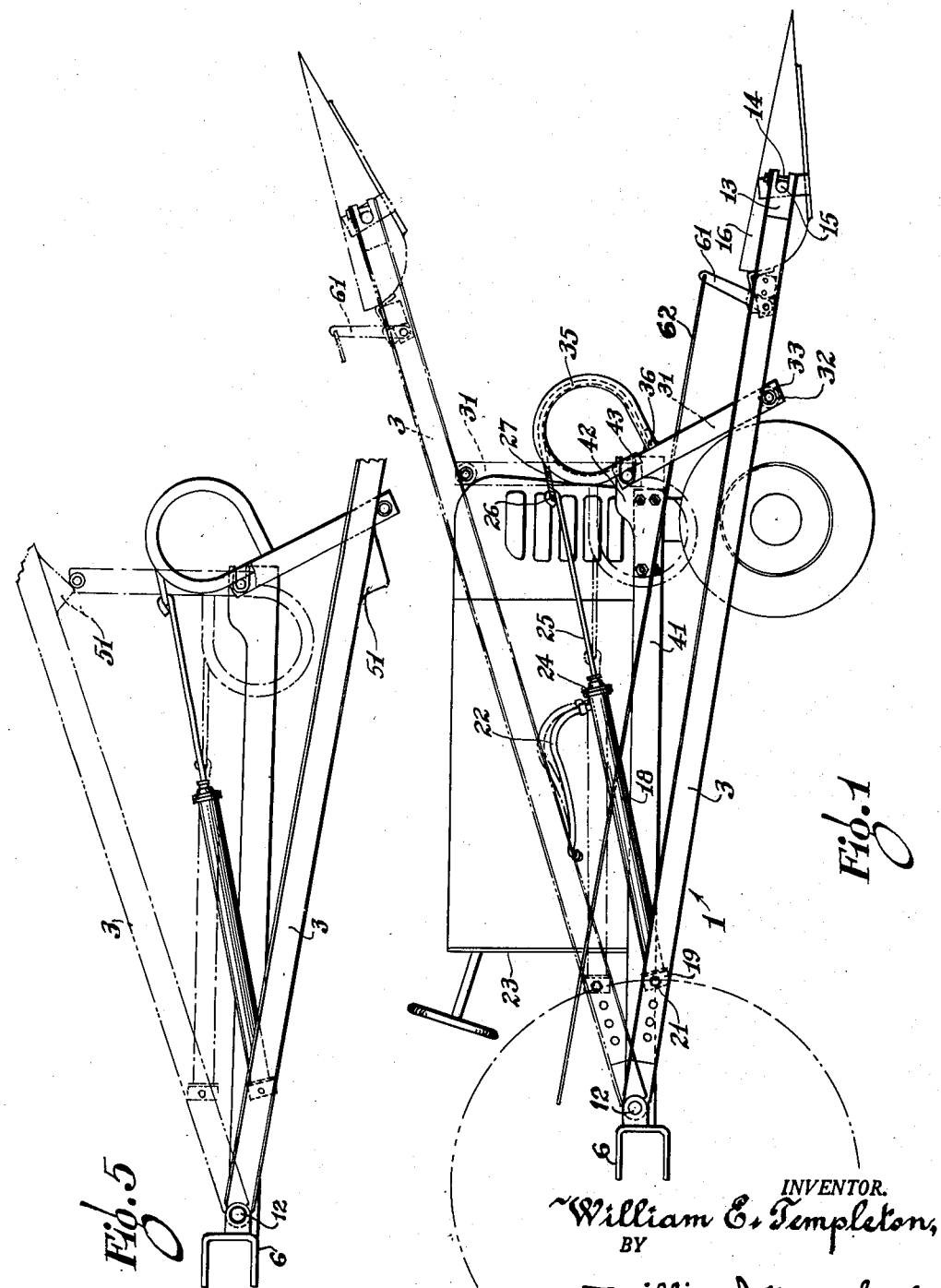
INVENTOR.
William E. Templeton,
BY
William J. Wesseler,
ATTORNEY.

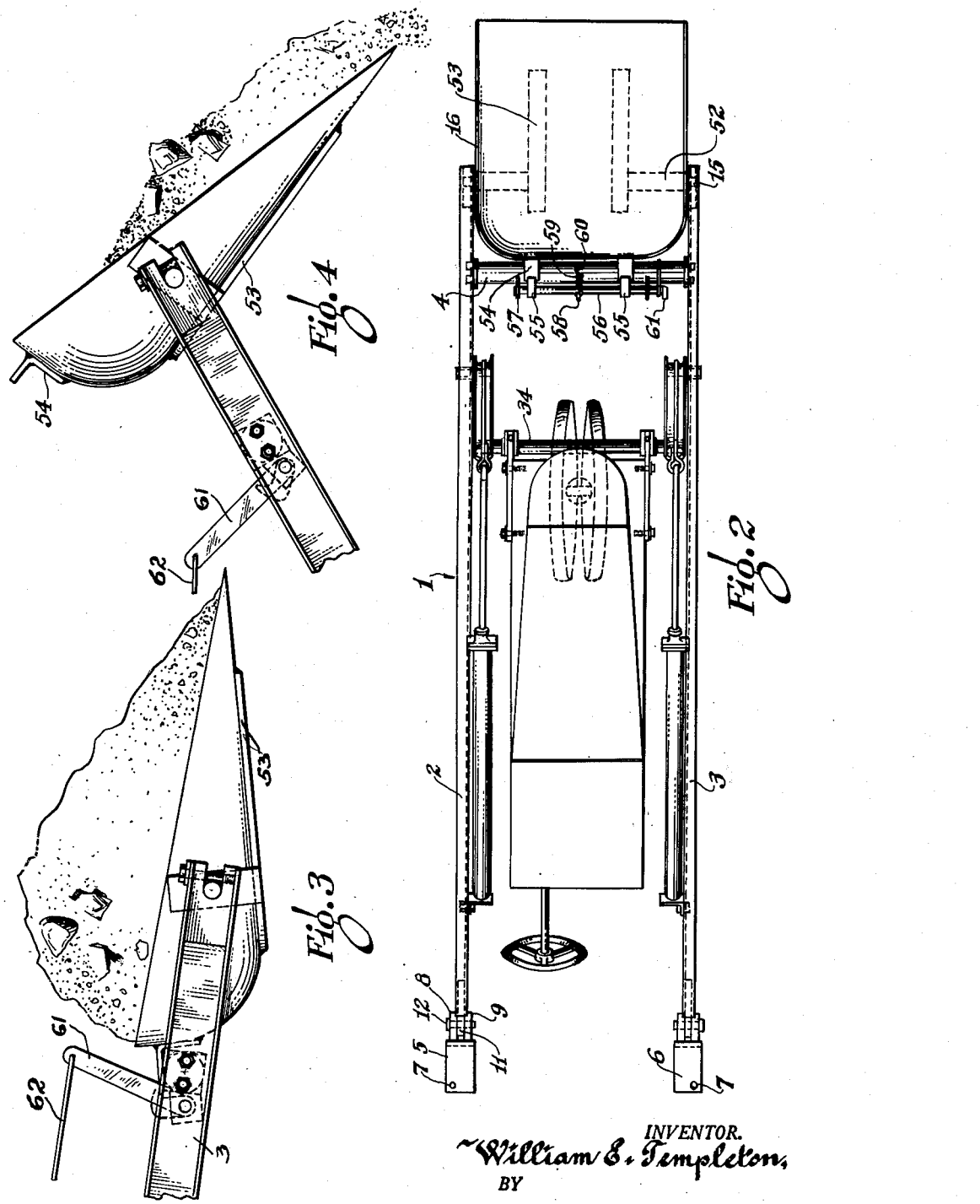

Patented May 10, 1949

2,469,615

UNITED STATES PATENT OFFICE 2,469,615

TRACTOR SHOVEL ATTACHMENT

William E. Templeton, Mansfield, Ohio

Application February 18, 1946, Serial No. 648,364

10 Claims. (Cl. 214—140)

This invention relates to a tractor attachment. More particularly, it comprises an apparatus to be connected to a tractor of conventional type and provide a material handling implement at its forward end together with means for operating the same.

The invention includes the provision of a material engaging and lifting unit with a supporting structure and elevating means for lifting said material engaging means and discharging the material at a predetermined point.

The invention also includes the utilization of power derived from the tractor for actuating the material lifting unit.

The invention includes also the provision of means for adjusting the material engaging and lifting unit to various heights.

The principal object of the present invention is to provide an improved form of tractor attachment for the handling of various types of material.

Another object of the invention is to provide a tractor attachment adapted to be readily applied and removed from the conventional type of tractor and having various positions of adjustment to adapt the same for different uses.

Another object of the invention is to provide a tractor attachment and operating means therefor secured at a low level to the tractor mechanism and providing for free vision at all times on the part of the tractor operator.

Another object of the invention is to provide a tractor attachment adapted to be operated by the fluid pressure apparatus of the tractor and having the operating and securing means positioned to provide high lift at low power cost.

Another object of the invention is to provide an attachment for tractors adapted to engage bulk material and to lift the same to an elevation with means permitting the release of such material and the discharge through the action of gravity with the automatic restoration of the apparatus to operative position after the discharge of the load.

Other and further objects of the invention will appear in the following description.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:

Figure 1 is a side elevation showing the apparatus as applied to a conventional type of tractor, the latter being shown somewhat diagrammatically and the elevated position of the apparatus being shown in dotted lines;

Figure 2 is a top plan view of the structure shown in Figure 1;

Figure 3 is a fragmentary side elevation showing the scoop in latched position carrying a load of bulk material;

Figure 4 is a view similar to Figure 3 showing the scoop in load-discharging position; and Figure 5 is a fragmentary view illustrating the use of a trackway extension on the underside of the frame members to provide additional lifting range.

As is clearly shown in the drawing, tractor attachment 1 comprises a pair of longitudinal members 2, 3, which may be in the form of steel channels of suitable size connected together adjacent to their forward ends by means of a heavy cross frame member 4 and provided at their rearward ends with brackets 5, 6 adapted to be engaged by means of suitable bolts 7 with a rear axle casing of the tractor. The forward faces of the brackets carry ears 8, 9 in spaced relation between which the pivot plates 11 of the side frame members 2, 3 are adapted to be received by a pivot pin 12, respectively. The extreme forward ends 13 of the side frame members are preferably provided with forwardly opening slots 14 within which are received trunnions 15 attached to the side portions of a scoop 16, as will hereinafter be set forth in detail.

The side frame members 2, 3 are provided with a series of openings 17 adjacent the pivot pins 12, such openings serving as points of attachment for hydraulic cylinders 18 provided at their rearward ends with brackets 19 and pivot pins 21. The hydraulic cylinders are connected by means of an oil hose 22 with the oil pressure line of the tractor through a controlling valve mechanism 23 within reach of the operator of the tractor. The forward end of the cylinder is provided with the conventional packing gland 24 through which the piston rod 25 projects, the piston rod having an eye 26 at its forward end connected with a cable 27, the other end of which is anchored to the operating mechanism for the raising and lowering of the frame members. This operating mechanism for the frame members comprises a pair of levers 31 having outwardly extending pins 32 at their free ends on which rollers 33 are engaged, said rollers bearing against the under side of their respective frame members 2, 3. The levers 31 are provided at their inner ends with rigid connections with a pivot bar 34 and have integral loops 35 providing what may be termed channel drums adapted to be engaged by the cables 27 heretofore referred to which are securely attached to said loops at their points of contact 36 with the levers 31. This construction provides for a high degree of leverage above the pivot point at the start of the lifting movement of the apparatus with a reduction in the amount of leverage and an increase in the amount of movement of the lever arms as the scoop reaches an elevated position. The pivot bar 34 is supported for pivotal movement immediately forwardly of the front end of the tractor frame 41 to which forwardly extending plates 42 are secured. The plates are provided with notched areas 43 within which the shaft 34 is received and secured for pivotal movement.

As is clearly shown in Figure 1, when pressure fluid is admitted to the cylinder 18, the cables 27 will be drawn toward the respective cylinders and will rotate the lever arms 31, pressing the rollers against the under side of said frame members 2, 3 and causing the scoop to be elevated to the dotted line position shown in Figure 1.

In order to obtain a somewhat higher lift and also to provide for the more rapid release of the mechanism, a trackway extension 51 may be provided on either side of the side frame members 2, 3 as shown in Figure 5, such trackway extension comprising a somewhat triangular unit suitably secured to the under side of each of the side frame members 2, 3 at substantially the highest point of elevation of the lever arms 31. The steepness of the under face of the trackway extensions 51 will serve to move the rollers on the lever arms 31 in a releasing direction when the fluid pressure in the cylinder is released. Thereupon the scoop and frame members will be restored to their initial position. Through the control of the valve member 23 the scoop may be carried at any desired point of elevation when the tractor is moving from one position to another.

The scoop 16, as stated, is provided with trunnions 15 at each side engaged in suitable bearings 14 at the front ends of the side frame members. The trunnions may have reenforcing strips 52 connected with reenforcing ribs 53 on the under side of the scoop. At the rear ends of the scoop, latch members 54 are provided. The latch members may comprise angle plates secured by welding to the rearward face of the scoop adjacent the upper outer corners of the rear face thereof, such latch members being adapted to ride beneath the hook members of cooperating latch members 55 carried on a latch bar 56 supported in brackets 57 on the rearward face of the cross brace 4 of the frame member. The latch bar 56 is provided with a control pin 58 connected by means of a spring 59 with a spring anchorage stud 60 on the cross bar 4. The latch bar 56 is provided with an upstanding arm 61 which provides a dump trip lever which is actuated by means of a cable 62 or other suitable connection by means of which the hooks 55 are retracted so as to release the latch members 54 secured to the rearward face of the scoop. When the dump trip lever is drawn rearwardly and the latch member is released, the load will overbalance the weighted rear end of the scoop and will automatically rotate the same to the position shown in Figure 4 when the load will slide over the forward edge of the scoop. As soon as the weight of the load is removed from the scoop, the rearward end of the scoop will overbalance the forward end. As the frame members are lowered, the latch members 54 will again engage beneath the hooks 55 and the scoop will again be held in its original position.

It should be noted that all of the points of connection of the tractor attachment are substantially in the horizontal plane of the rear axle and that the operating mechanism is pivoted substantially in the plane of the frame members of the tractor. The hydraulic power is exerted through the application of tension along the line of low resistance and the load is lifted adjacent the forward end of the frame where a large mechanical advantage is provided through the long leverage between the scoop and the pivot point for the frame members. It will also be noted that as the cable approaches the adjacent end of the cylinder that the power will be applied at a point more closely adjacent the pivot and a greater degree of movement will be caused in the free ends of the levers 31. This rapid action also applies to the form of construction as shown in Figure 5 wherein the extension trackway will be engaged by the rollers on the ends of the levers 31 and will cause an additional lift of the scoop preliminary to the unloading operation or other desired action of such mechanism.

The apparatus can be readily adjusted in several respects. Thus the angle of the load lifting unit can be raised or lowered by reversing and interchanging the brackets 6 and 7 as shown respectively in Figures 1 and 5, due to the ears 8 and 9 being offset from the horizontal central axial line of the brackets. The stopping point of the lift may be changed by moving the pivot pins 21 of the cylinders 18 to a selected pivot point of a series provided adjacent the rearward ends of the longitudinal members 2 and 3.

It will be noted that only four points of support are provided for the complete operative structure. Thus the load lifting unit is connected at each side to the rear axle by the brackets and the frame lifting unit is connected at each side of frame of the tractor by the plates 42. The hydraulic pressure line has a separate connection readily engaged with the cylinder or oil pressure system.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. An apparatus of the character set forth having in combination a frame consisting of a pair of brackets adapted to be mounted on the rear axle of a tractor and a pair of frame members pivotally connected at their inner ends to said brackets, respectively, a material moving element pivotally supported at and between the front ends of said frame members, means for releasably holding said element in material engaging position on said frame members, and elevating means for said frame members consisting of a pair of devices pivotally mounted on the tractor at a low level adjacent to the front end thereof and means between each device and the adjacent frame member for operating the device about its pivot to raise said frame member, said brackets being reversibly connected to the tractor axle to selectively support said frame members at a higher or lower level to change the angle of said material moving element.

2. An apparatus of the character set forth having in combination a frame consisting of a pair of members adapted to be pivotally connected to the rear axle of a tractor, a material moving element pivotally supported at and between the front ends of said frame members, means for releasably holding said element in material engaging position on said frame members, and elevating means for said frame members comprising a pair of devices pivotally mounted on the tractor at a low level adjacent to the front end thereof and each operatively connected to one of said frame members and fluid pressure means consisting of cylinder and piston elements between and connected to each device and the adjacent frame member for operating said devices to raise said frame members.

3. An apparatus as claimed in claim 2 wherein the connection of that fluid pressure element connected to each said frame member is adjustable longitudinally of the latter.

4. An apparatus of the character described having in combination a pair of longitudinal frame members adapted to be positioned on opposite sides of a tractor and extending from the rear axle thereof to a position in front of the tractor, pivotal connections between the inner ends of said frame members and the rear axle of the tractor, a transverse frame member connecting said longitudinal members in spaced relation at the forward end portions thereof, a material handling unit pivotally mounted at the extreme forward ends of said longitudinal members, latching means on the rearward end of said unit, cooperating latching means on the transverse frame member adapted to be actuated by the operator, a transverse shaft mounted on the forward portion of the tractor, lever members fixedly connected at their inner ends to said shaft and slidably and pivotally connected at their outer ends to said frame members, a loop the inner side of which is fixedly connected to said shaft and disposed in a plane parallel to one of said frame members, a rod, hydraulically operated means rearward of said shaft and connected to the inner end of said rod and a flexible member connected at its inner end to the outer end of said rod, the outer end portion of said flexible member being wrapped around said loop and connected thereto adjacent the outer side of said shaft.

5. An apparatus as claimed in claim 4 wherein said hydraulically operated means are mounted on one of said frame members.

6. An apparatus of the character described having in combination a pair of longitudinal frame members adapted to be positioned in opposite sides of a tractor and extending from the rear axle thereof to a position in front of the tractor, means for pivotally attaching said frame members to the rear axle of the tractor, a transverse frame member connecting said longitudinal members in spaced relation adjacent the forward ends thereof, a material handling unit pivotally mounted at the extreme forward ends of said longitudinal members, latching means on the rearward end portion of said unit, cooperating latching means on the transverse frame member adapted to be actuated by the operator, a mechanism for swinging said frame members about their pivotal attaching means to raise said unit, said mechanism consisting of a transverse shaft rotatably supported on the tractor frame adjacent the front end thereof, lever members fixed at their inner ends to said shaft and operatively connected at their outer ends to said frame members, loops fixedly related to said shaft at the inner ends of said lever members, hydraulic cylinders wholly supported on and secured to the frame members, respectively, rearwardly of said shaft and flexible members operatively connected at their inner ends to the pistons in said cylinders, the outer end portions of said flexible members being wound on the remote side of said loops, respectively, and secured at their outer ends thereto.

7. An apparatus of the character described having in combination a pair of spaced frame members the inner ends of which are adapted to be pivotally engaged with the rear axle of a tractor, a material handling unit pivotally mounted on said frame members at the extreme forward ends thereof, and a mechanism for swinging said frame members upwardly, said mechanism consisting of a shaft rotatably supported on the tractor, lever members fixedly connected at their inner ends to said shaft and extending substantially radially thereof, the outer ends of said lever members being pivotally and slidably connected to said frame members, respectively, arcuate walls disposed on the forward side of said lever members, respectively, and fixedly connected to said shaft, said walls being struck from a center spaced from said shaft and having a radius less than that of said lever members, flexible members wound on said walls and fixedly connected to the outer ends thereof and hydraulic mechanism mounted rearwardly of said shaft and connected to the inner ends of said flexible members for exerting pull thereon rearwardly.

8. An apparatus of the character described having in combination a frame formed of a pair of longitudinal elements adapted to be pivotally mounted at their rear ends on the rear portion of a tractor, a cross frame member adjacent the forward end portions of said longitudinal elements, a load-engaging unit pivotally supported at the forward ends of said elements, latching means on said cross frame member adapted to hold and release said unit with reference to the elements, means for controlling said latching means extending to a point adjacent the operator's position, a frame elevating mechanism positioned at the front end of the tractor, means for pivotally securing said elevating mechanism to the front end of the tractor, said mechanism consisting of lever arms extending to one side of said pivot and each carrying a roller at its free end arranged to engage beneath the adjacent longitudinal element, a loop member formed on each lever arm at its end adjacent said pivot and projecting outwardly in advance of the front end of said tractor, flexible means engaged over each said loop member to rotate the same about said pivot, and hydraulic means for drawing each of said flexible means rearwardly and elevating said frame.

9. An apparatus of the character set forth having in combination load lifting frame members pivotally mounted at the rearward end of a tractor and having a load lifting unit in advance of the tractor, elevating means pivotally mounted on the front end of the tractor and comprising a shaft rotatably supported on the forward frame of the tractor and having a pair of lever members at each end thereof, each lever member comprising a lifting bar extending downwardly and carrying at its free end a roller adapted to engage the under surface of the adjacent frame member and apply lifting force thereagainst when operated about its pivot and an actuating loop formed adjacent to and forwardly of said bar on each of said lever members, a flexible element engaged about each of said loops, and pressure-exerting means adapted to draw said flexible element rearwardly and move said lifting bars in an upward direction to lift the frame members.

10. An apparatus of the character set forth having in combination load lifting frame members adapted to be pivotally mounted at the rearward end of a tractor and having a load lifting unit in advance of the tractor, elevating means pivotally mounted on the front end of the tractor and comprising a shaft rotatably supported on the forward frame of the tractor and having a pair of lever members fixed to the opposite ends thereof, each lever member comprising a lifting bar extending downwardly and carrying at its free end a roller adapted to engage the under surface of the adjacent frame member and apply lifting force thereagainst when said bar is operated by said shaft, and an actuating loop provided adjacent to said shaft and forwardly of the adjacent bar, an extension trackway on the underside of each frame member in the path of said roller, a flexible element engaged about each of said loops, and pressure-exerting means adapted to draw said flexible elements rearwardly and move said lifting bars in an upward direction and against said extension trackways to lift the frame members to their extreme limit of upward movement.

WILLIAM E. TEMPLETON.

REFERENCES CITED

The following references are of record in the file of this patent:

UNITED STATES PATENTS

| Number | Name | Date |
|---|---|---|
| 1,138,873 | Hubback | May 11, 1915 |
| 2,019,938 | Stephens | Nov. 5, 1935 |
| 2,286,947 | Bankson | June 16, 1942 |
| 2,301,102 | Werthman et al. | Nov. 3, 1942 |
| 2,332,742 | Mott | Oct. 26, 1943 |
| 2,371,273 | Walker | Mar. 13, 1945 |
| 2,404,820 | Wuertz et al. | July 30, 1946 |
| 2,415,892 | Koehl et al. | Feb. 18, 1947 |
| 2,433,086 | Borgelt | Dec. 23, 1947 |
| 2,435,098 | Pokorny | Jan. 27, 1948 |